(12) United States Patent
Lin et al.

(10) Patent No.: US 11,770,359 B2
(45) Date of Patent: Sep. 26, 2023

(54) MAINTAINING COMMUNICATIONS IN A FAILOVER INSTANCE VIA NETWORK ADDRESS TRANSLATION

(71) Applicant: Palo Alto Networks, Inc., Santa Clara, CA (US)

(72) Inventors: Shu Lin, Saratoga, CA (US); Patrick Xu, Santa Clara, CA (US); Eswar Rao Sadaram, Saratoga, CA (US); Hao Long, Campbell, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/651,143

(22) Filed: Feb. 15, 2022

(65) Prior Publication Data

US 2022/0174036 A1    Jun. 2, 2022

Related U.S. Application Data

(63) Continuation of application No. 16/848,041, filed on Apr. 14, 2020, now Pat. No. 11,271,900, which is a continuation of application No. 15/917,254, filed on Mar. 9, 2018, now Pat. No. 10,630,638.

(51) Int. Cl.
| | |
|---|---|
| *H04L 61/2517* | (2022.01) |
| *H04L 69/40* | (2022.01) |
| *H04L 67/10* | (2022.01) |
| *G06F 9/455* | (2018.01) |
| *G06F 11/20* | (2006.01) |

(52) U.S. Cl.
CPC ...... *H04L 61/2517* (2013.01); *G06F 9/45558* (2013.01); *G06F 11/2023* (2013.01); *H04L 67/10* (2013.01); *H04L 69/40* (2013.01); *G06F 2009/45595* (2013.01)

(58) Field of Classification Search
CPC ..... H04L 61/2517; H04L 67/10; H04L 69/40; G06F 9/45558; G06F 11/2023; G06F 2009/45595
USPC ......................................................... 709/249
See application file for complete search history.

(56) References Cited

U.S. PATENT DOCUMENTS

| | | | |
|---|---|---|---|
| 7,480,737 B2 | 1/2009 | Chauffour et al. | |
| 7,542,987 B2 | 6/2009 | Lubbers et al. | |
| 7,788,345 B1 | 8/2010 | Sukiman et al. | |
| 8,051,322 B2 | 11/2011 | Matsumoto et al. | |
| 8,589,514 B2 | 11/2013 | Duggal et al. | |
| 8,751,691 B1 | 6/2014 | Brandwine et al. | |

(Continued)

*Primary Examiner* — Frantz B Jean
(74) *Attorney, Agent, or Firm* — GILLIAM IP PLLC

(57) ABSTRACT

Described herein are systems, methods, and software to enhance failover operations in a cloud computing environment. In one implementation, a method of operating a first service instance in a cloud computing environment includes obtaining a communication from a computing asset, wherein the communication comprises a first destination address. The method further provides replacing the first destination address with a second destination address in the communication, wherein the second destination address comprises a shared address for failover from a second service instance. After replacing the address, the method determines whether the communication is permitted based on the second destination address, and if permitted, processes the communication in accordance with a service executing on the service instance.

20 Claims, 7 Drawing Sheets

(56) References Cited

U.S. PATENT DOCUMENTS

| | | |
|---|---|---|
| 9,319,272 B1 | 4/2016 | Brandwine et al. |
| 9,473,481 B2 | 10/2016 | Lietz et al. |
| 9,628,294 B1 | 4/2017 | Brandwine et al. |
| 9,787,503 B2 | 10/2017 | Moreman |
| 9,813,374 B1 | 11/2017 | Magerramov et al. |
| 11,513,828 B1* | 11/2022 | Zelenov ............... G06F 9/45558 |
| 2002/0178268 A1 | 11/2002 | Aiken, Jr. et al. |
| 2006/0146879 A1 | 7/2006 | Anthias et al. |
| 2006/0215546 A1 | 9/2006 | Tochio |
| 2006/0262785 A1 | 11/2006 | Duggal et al. |
| 2014/0282525 A1 | 9/2014 | Sapuram et al. |
| 2015/0339136 A1 | 11/2015 | Suryanarayanan et al. |
| 2016/0065448 A1* | 3/2016 | Loveless ................. G06Q 40/04 370/218 |
| 2016/0210209 A1 | 7/2016 | Verkaik et al. |
| 2016/0212012 A1* | 7/2016 | Young ........................ G06F 9/00 |
| 2017/0075719 A1 | 3/2017 | Scallan et al. |
| 2017/0083354 A1 | 3/2017 | Thomas et al. |
| 2017/0126626 A1 | 5/2017 | Datta et al. |
| 2017/0214550 A1 | 7/2017 | Kumar et al. |
| 2017/0244593 A1* | 8/2017 | Rangasamy ........ H04L 61/3015 |
| 2018/0018195 A1 | 1/2018 | Kim et al. |
| 2018/0152455 A1* | 5/2018 | Lee ..................... H04L 63/0884 |
| 2019/0036819 A1* | 1/2019 | Kancherla ............... H04L 69/22 |
| 2019/0327135 A1* | 10/2019 | Johnson .................. H04L 67/34 |
| 2020/0336420 A1* | 10/2020 | Joshi ...................... H04L 45/02 |

* cited by examiner

| SOURCE IP ADDRESS 410 | DESTINATION IP ADDRESS 411 | SOURCE PORT 412 | DESTINATION PORT 413 | PROTOCOL 414 |
|---|---|---|---|---|
| IP ADDRESS 420 | IP ADDRESS 425 | PORT 430 | PORT 435 | PROTOCOL 440 |
| IP ADDRESS 421 | IP ADDRESS 425 | PORT 431 | PORT 436 | PROTOCOL 441 |
| IP ADDRESS 422 | IP ADDRESS 425 | PORT 432 | PORT 437 | PROTOCOL 442 |
| IP ADDRESS 423 | IP ADDRESS 425 | PORT 433 | PORT 438 | PROTOCOL 443 |
| IP ADDRESS 424 | IP ADDRESS 425 | PORT 434 | PORT 439 | PROTOCOL 444 |

DATA STRUCTURE 400

FIGURE 4

MAINTAINING COMMUNICATIONS IN A FAILOVER INSTANCE VIA NETWORK ADDRESS TRANSLATION

TECHNICAL BACKGROUND

Virtual private clouds provide an efficient mechanism to dynamically increase or decrease processing resources as they are required by an organization. These virtual private clouds may provide various operations for the organization, including web hosting, data processing, data storage, firewall operations, or some other similar operation using networked servers rather than physical computing systems that are maintained by the organization. Consequently, as additional processing resources are required, the organization may deploy additional virtual resources, such as virtual machines and containers, capable of providing the desired operations of the organization.

While virtual private clouds permit organizations to deploy and remove computing resources, difficulties often arise in managing the communication between local computing assets of the organization (desktop computing systems, virtual machines, and the like) with the virtual computing instances that are located on the cloud service provider's host computing systems. In particular, software defined networking configurations of the cloud service provider may make it difficult for organizations to maintain connections with their virtual private cloud when a connection is transitioned from a primary processing instance in the virtual private cloud to a failover processing instance in the virtual private cloud. Specifically, it may be difficult to maintain the required addressing to transition communication sessions from the primary instance to the backup instance.

SUMMARY

The technology described herein enhances failover operations for service instances in a cloud computing environment. In one implementation, a method of operating a first service instance to provide failover operations for a second service instance includes obtaining a communication from a computing asset, wherein the communication comprises a first destination address. The method further provides replacing the first destination address with a second destination address in the communication, wherein the second destination address comprises a shared address for failover from the second service instance. Once replaced, the method also includes determining whether the communication is permitted based at least in part on the second destination address and maintained connection information for the second service instance, and when the communication is permitted, processing the communication in accordance with a service executing on the service instance.

BRIEF DESCRIPTION OF THE DRAWINGS

FIG. 4 illustrates a data structure to maintain communication session information according to an implementation.

DETAILED DESCRIPTION

Figure 1:
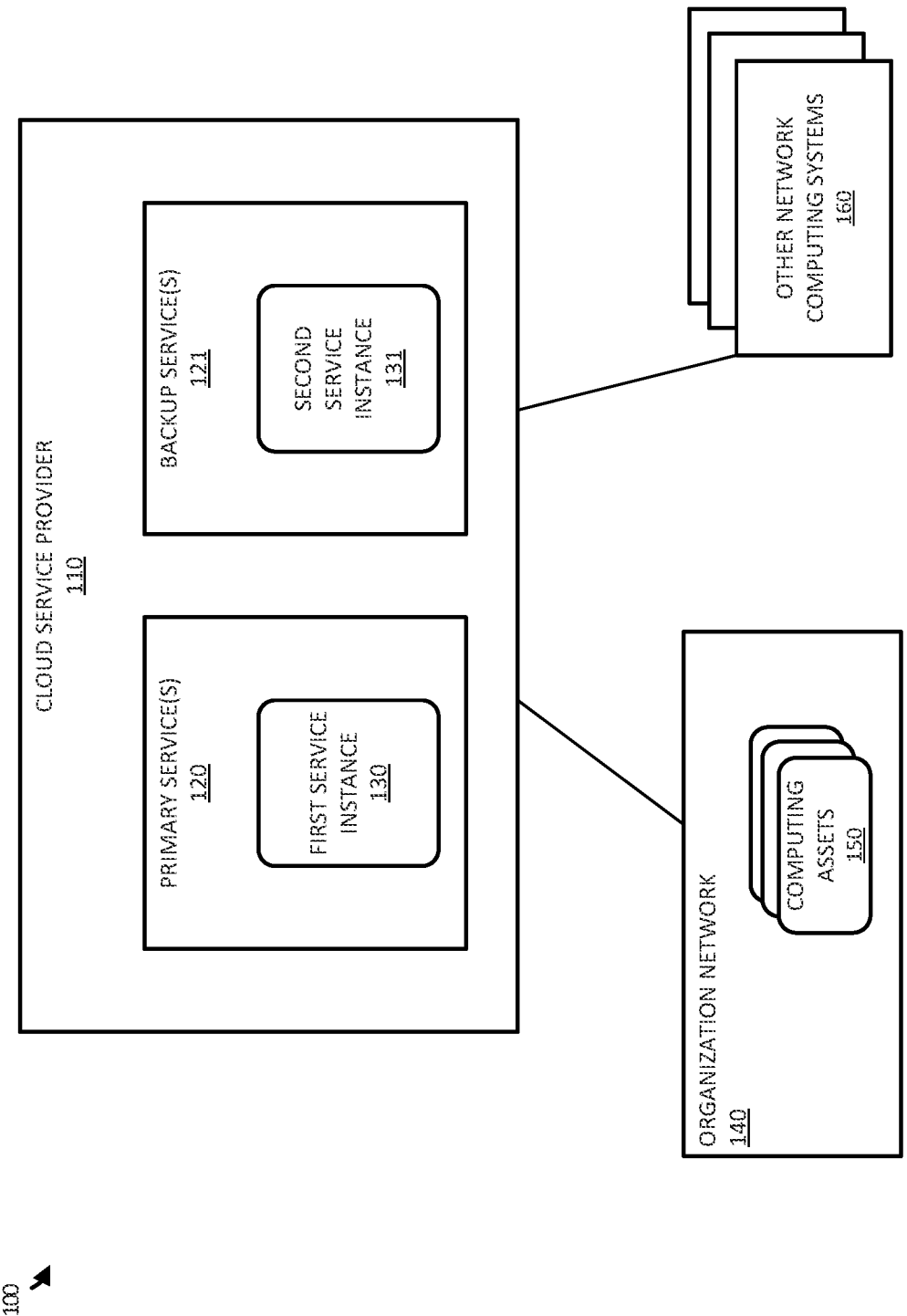
FIG. 1 illustrates a computing environment to manage failover in service instances of a cloud service provider according to an implementation.

FIG. 1 illustrates a computing environment 100 to manage failover in service instances of a cloud service provider according to an implementation. Computing environment 100 includes cloud service provider 110, organization network 140, and other network computing systems 160. Cloud service provider 110 further includes primary service(s) 120 with at least first service instance 130 and backup service(s) 121 with at least second service instance 131. Primary service(s) 120 and backup service(s) 121 may be hosted in separate locations in some examples, and may further correspond to different internet protocol (IP) address subnets. Organization network 140 further includes computing assets 150, which may comprise physical computing systems and/or virtual computing elements, such as containers or virtual machines capable of communication with the instances of the cloud service provider.

In operation, cloud service provider 110 executes host computing systems that permit multiple organizations and users to initiate and execute virtual service instances on remote computing systems. These services may include web hosting services, data processing services, data storage services, firewall services, or some other similar service. The instances executed on the host computing systems may include full operating system virtual machines and/or containers, wherein the containers may comprise Linux containers, Docker containers, and other similar namespace based containers. Rather than requiring a separate operating system, which is required for virtual machines, containers may share resources from the host computing system, wherein the resources may include kernel resources from the host operating system, and may further include repositories and other approved resources that can be shared with other containers or processes executing on the host. However, although resources may be shared between the containers on a host, the containers are provisioned to have private access to the operating system with their own identifier space, file system structure, and network interfaces. The operating system may also be responsible for allocating processing resources, memory resources, network resources, and other similar resources to the containerized endpoint.

In the present implementation, organization 140 employs primary service(s) 120 and backup service(s) 121, wherein backup service(s) 121 may be used as a failover for primary service(s) 120 when the services are unavailable. This unavailability may occur due to an update of the primary service instances, an update to the host computing system, a power outage or some other similar failover occurrence. As a result, communication connections that were established by computing assets 150 with first service instance 130 may be required to be transitioned to second service instance 131 to ensure continual operations. In making this transition, networking services, including software defined networking services, provided by the cloud service provider 110 may be used to route communications to second service instance 131 instead of first service instance 130. To provide this change in routing, first service instance 130 and second service instance 131 may be allocated a shared network address, wherein computing assets 150 may use the shared destination network address to communicate with the service and cloud service provider 110 may direct the communication to the active service. Once received, the service may identify and modify attributes within the communication packet and determine whether the packet is permitted based on the attributes.

Figure 2:
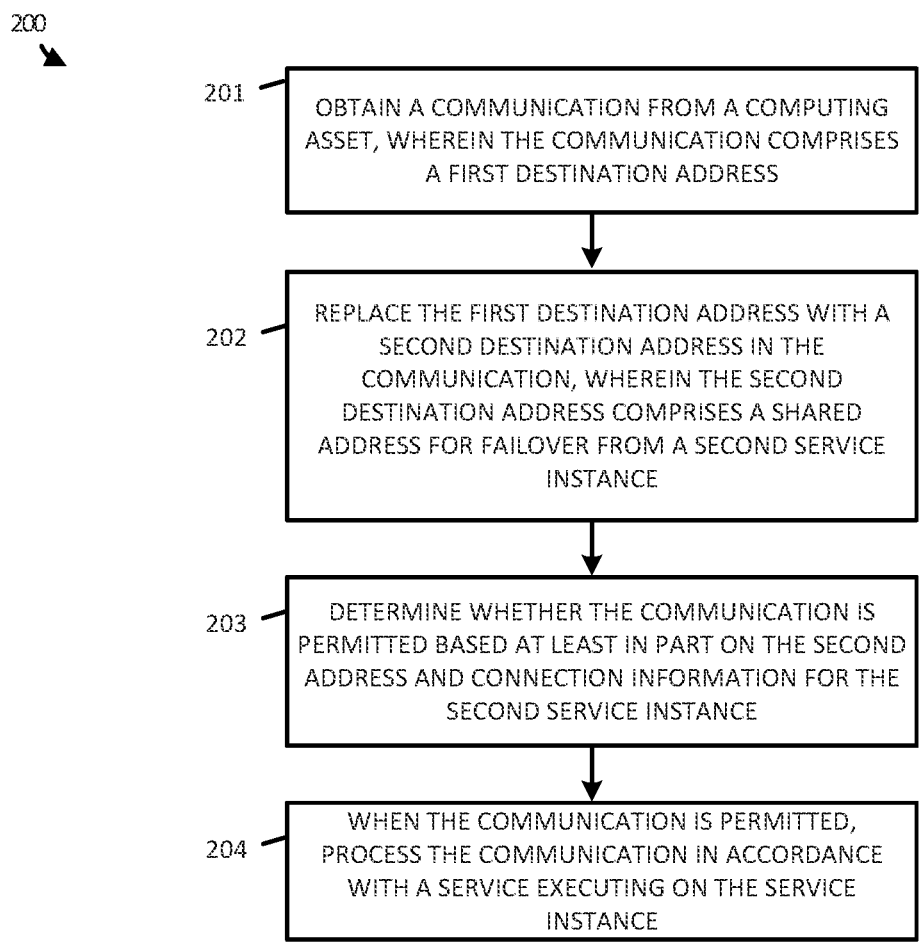
FIG. 2 illustrates an operation of a service instance to provide failover operations according to an implementation.

To further demonstrate the operations of computing environment 100, FIG. 2 is provided. FIG. 2 illustrates an operation 200 of a service instance to provide failover operations according to an implementation. The processes of operation 200 are referenced parenthetically in the paragraphs that follow with reference to systems and elements of computing environment 100. In particular, operation 200 is described with reference to second service instance 131, however, it should be understood that similar operations may be employed other backup services in a cloud service provider.

As depicted in FIG. 2, operation 200 includes obtaining (201) a communication from a computing asset in organization network 140, wherein the communication comprises a first destination address. As described herein, computing assets 150 of organization network 140 may establish a connection with first service instance 130, wherein the established connection may identify various traits between the source asset and destination instance. These traits may include a source IP address, destination IP address, source port, destination port, protocol, or some other similar information about the communication. Once the communication is established, first service instance 130 may monitor incoming communications to determine whether the communication matches an existing session, and if there is a match, permitting the communication to be processed in accordance with a service executing on the instance.

As described previously, first service instance 130 and second service instance 131 may be allocated a shared IP address, wherein an asset may use the shared address to address the required service. Once received by the cloud service provider, cloud service provider 110 may use software defined networking to route the communication to the currently active instance. In particular, cloud service provider 110 may perform network address translation to translate the shared IP address to a private IP address associated with first service instance 130 when the first instance is active. However, because second service instance 131 would be unable to identify connections that used the private IP address associated with first service instance 130, first service instance 130 may perform a second address translation to translate the private IP address back to the shared IP address shared between service instances 130 and 131. Once translated, the connection information (IP addresses, ports, protocol, and the like) may be maintained by first service instance 130. As the connection information is maintained by the first instance, the connection information is also provided to second service instance 131 to ensure that second service instance 131 is prepared in case of failover. This connection information may be provided upon connection setup, connection state change, or connection close in the first service instance 130, may be provided periodically by first service instance 130 to second service instance 131, may be provided upon request by second service instance 131, or may be provided at any other similar interval from first service instance 130 to second service instance 131.

Once a failover occurs and a communication is received at second service instance 131 using a first destination address that is private to second service instance 131, operation 200 on second service instance 131 replaces (202) the first destination address with a second destination address in the communication, wherein the second destination address comprises the shared address used for the failover from the first service instance 130. In this manner, by replacing the destination address that is private to second service instance 131 with the shared destination address of service instances 130 and 131, second service instance 131 is capable of directly comparing traits in the received communication to traits in the maintained connection information. Using operation 200, second service instance 131 may determine (203) whether the communication is permitted based at least in part on the second address (the shared address between first service instance 130 and second service instance 131) and the maintained connection information for first service 130. When a communication is permitted, or when the traits of the incoming communication match those of a previously identified communication by first service instance 130, then second service instance 131 may process the communication in accordance with a service executing on the service instance.

In some implementations, in determining whether the packets are permitted when they are received at the second service instance 131, second service instance 131 may inspect the packet to identify the destination IP address in the packet and replace the destination IP address with the shared IP address for the service instances. Once replaced, second service instance 131 may perform packet inspection on all of the traits of the packet to determine whether a communication is carried over from the first service instance.

In some examples, primary service(s) 120 and backup service(s) 121 may correspond to different IP subnets that correspond to different zones of cloud service provider 110. In particular, primary service(s) 120 may be provided with a first subnet (range of IP addresses), while backup service (s) 121 may be provided with a second subnet (range of IP addresses). In managing the communication for services across the subnets, the shared address may comprise an address that does not belong to either of the subnets. Thus, permitting the cloud service provider to allocate the address to the instances as they are required. In some implementations, the different zones for the cloud service provider may correspond to different physical locations, such as different server or different data centers, wherein the different data centers may be located in different geographic regions in some examples.

Figure 3A:
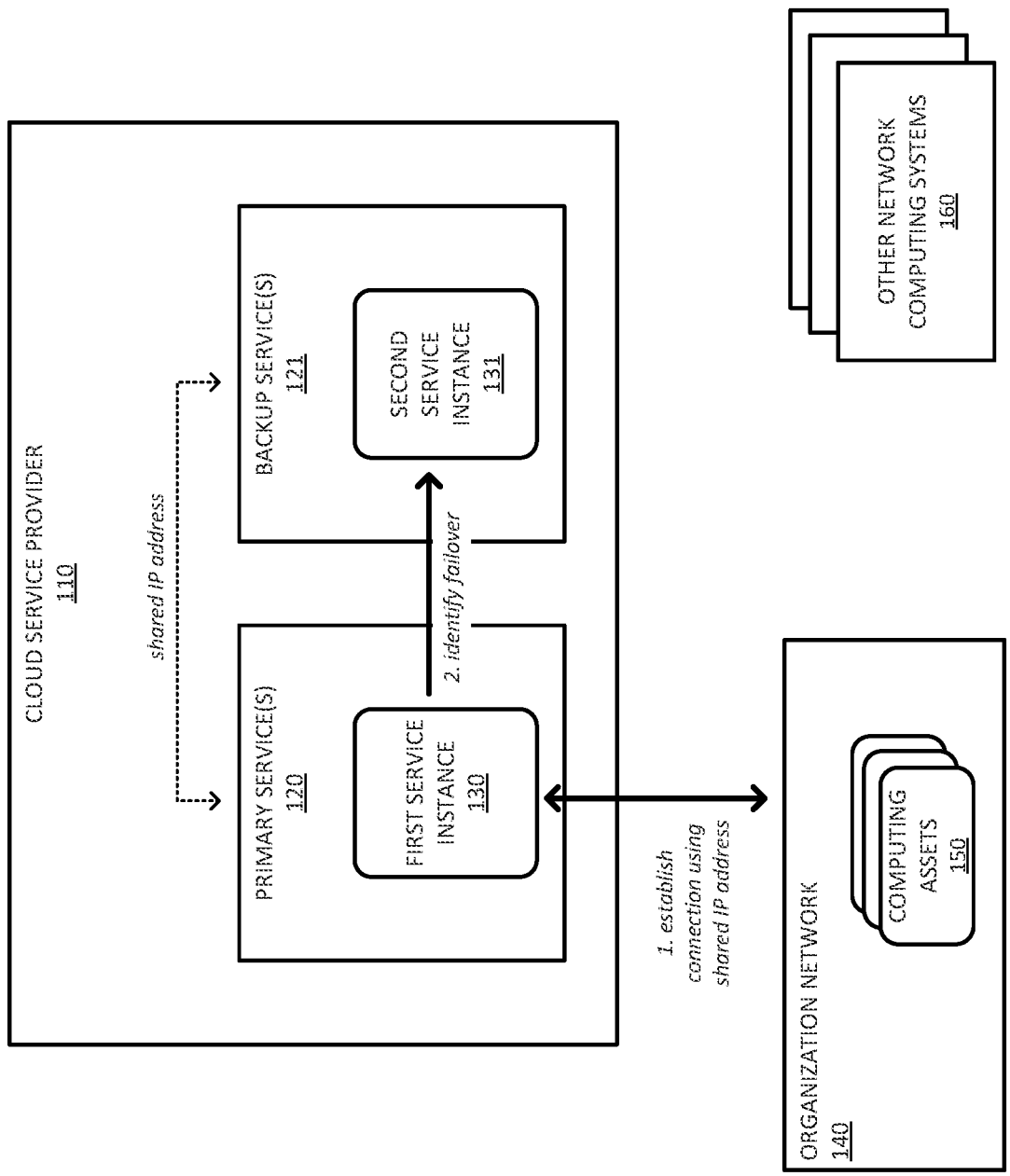
FIGS. 3A and 3B illustrate an operational scenario of providing failover operations from a first service instance to a second service instance according to an implementation.
Figure 3B:
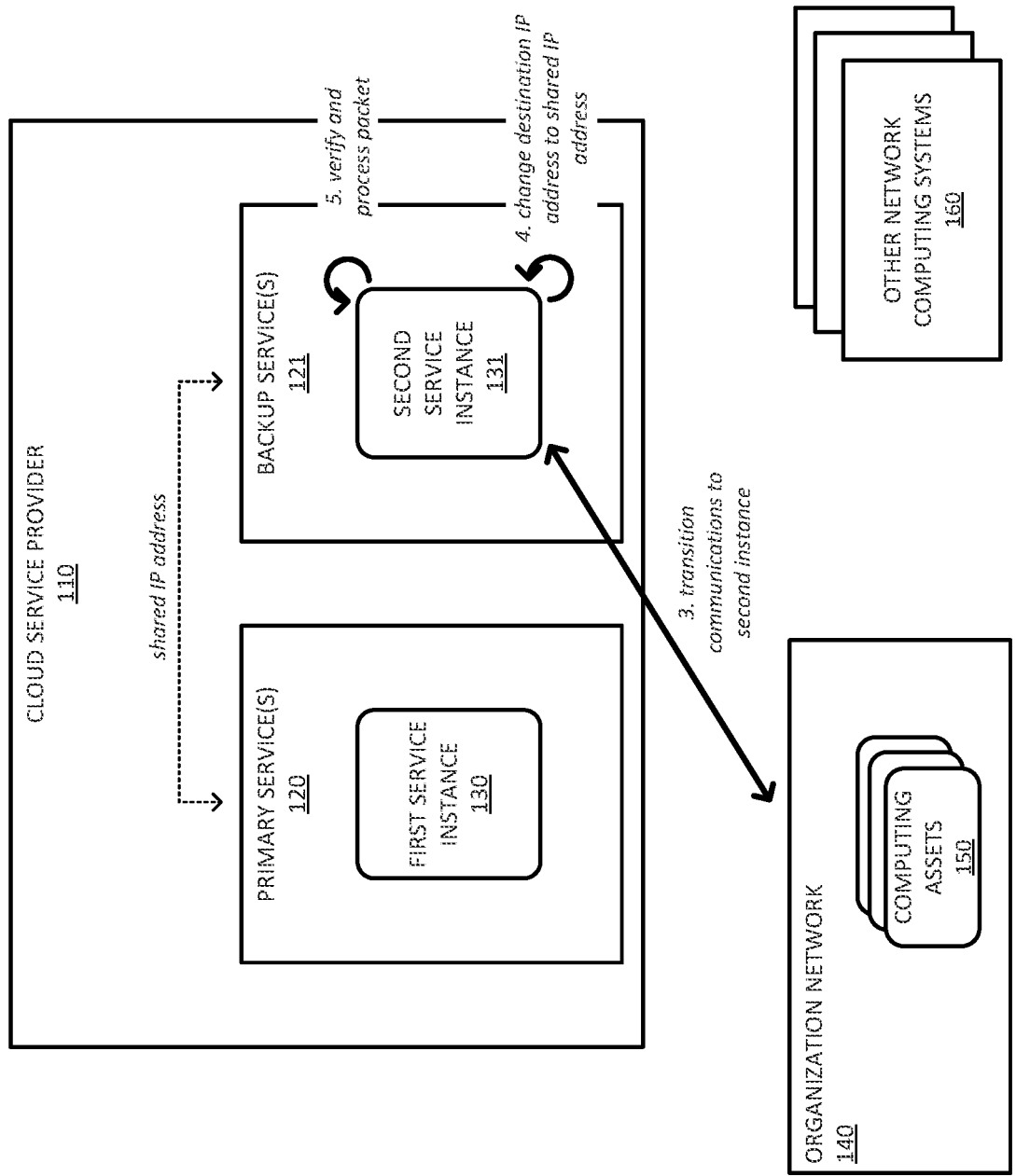

FIGS. 3A and 3B illustrate an operational scenario or providing failover operations from a first service instance to a second service instance according to an implementation. The operational scenario includes systems and elements of computing environment 100 of FIG. 1.

Referring first to FIG. 3A, a computing asset within organization network 140 may establish, at step 1, a connection using the shared IP address for first service instance 130 and second service instance 131. In establishing the connection, the computing asset may use the shared destination IP address that is used by service instances 130-131 and generate a communication request to the service. When the communication is identified by the software defined networking operations of cloud service provider 110, cloud service provider 110 may replace the shared destination address with the unique destination address corresponding to service instance 130 and forward the communication to service instance 130. Once received, first service instance 130 is required to register and establish the connection with the asset from organization network 140. In particular, first service instance 130 may replace the unique IP address with the shared IP address, and maintain connection information about the communication in one or more data structures. The connection information may include source and destination IP addresses (wherein the destination IP address comprises the shared address), source and destination ports, protocol, or some other similar trait. Once established, first service instance 130 may exchange data packets with the computing asset to provide the desired service.

Once the communication is established, a failover condition may be identified for first service instance 130 at step 2. This failover instance may be a result of power outage for the host of the first service instance, a software update for the host of the first service instance, a software update on the service instance itself, or some other similar failover event. As a result, computing assets with computing network 140 may be incapable of communicating with the initial service instance. Consequently, communications from the computing assets may be diverted to a second service instance that provides the same or similar functionality as the first instance.

Referring to FIG. 3B, after a failover has occurred with first service instance 130, any subsequent communications from the asset are transitioned, at step 3, to second service instance 131. In transitioning the communications, cloud service provider may transition the connected and shared address from first service instance 130 to second service instance 131. In particular, the software defined networking of cloud service provider 110 may remap communications with the shared address to service instance 131 to ensure high availability of the service. Once a communication is identified, cloud service provider 110 may replace the shared address with a unique private address allocated to second service instance 131, and forward the communication to the instance. After the communication is received at the network interface of the instance, second service instance 131 may change, at step 4, the destination IP address to the shared IP address that was used by first service instance 130 in establishing the connection. Once replaced, second service instance may verify, at step 5, the communication and, if verified, may process the packet using the service executing on the instance. In some examples, in verifying the packet, second service instance 131 may compare information in the packet header (including the replaced destination IP address) to maintained connection information for the first service instance 130. Specifically, second service instance may perform packet inspection after replacing the unique destination address with the shared destination address to identify traits of the packet. Once the traits are identified the traits may be compared to one or more data structures to determine whether an existing connection exists. If it does exist, the communication may be processed in accordance with a service executing on the instance, however, if a connection is not identified within the connection information, then the communication may be blocked.

In some implementations, in maintaining the connection information for first service instance 130, second service 131 may be configured to obtain the information from the first service instance. This information may be provided periodically, provided based on requests from second service instance 131, or provided at any other similar interval. Consequently, when a failover condition occurs, second service instance 131 may include the required connection information to provide the same or similar functionality of the primary service.

While not explicitly depicted in the examples of FIGS. 3A and 3B, it should be understood that in some examples primary service(s) 120 and backup service(s) 121 may operate in separate physical computing locations. These separate locations may comprise separate physical host computing systems and/or separate data centers. In some examples, primary service(s) 120 and backup service(s) 121 may each be allocated a different IP subnet that corresponds to the different locations or zones of the services. Additionally, when the shared IP address is introduced, the shared IP address may not correspond to either of the subnets, but rather may be used by the cloud service provider to manage the forwarding of the communications to the particular active instance.

FIG. 4 illustrates a data structure 400 to maintain communication session information according to an implementation. Data structure 400 includes columns for source IP address 410, destination IP address 411, source port 412, destination port 413, and protocol 414. Although demonstrated with five columns for traits in the present implementation, it should be understood that additional or fewer traits may be used to determine whether a communication is permitted.

As described herein, organizations may employ a cloud service provider to dynamically deploy service instances as they are required. In some implementations, the services may include a verification operation, wherein communications that have been established between assets in the organization's computing environment and the service may be approved for processing by the service, while communications that have not been established may be blocked by the service. In the present implementation, to ensure a cohesive handoff and high availability between a primary and a backup service in a cloud service provider, an organization may use a shared destination IP address for the service. This shared destination IP address is used by software defined networking operations in the cloud service provider to deliver packets to one of the primary or backup service based on which of the services is currently active. However, when the software defined networking provides the packet to the service, the service identifies the packet as being received on the unique IP address for the service. As a result, the service transitions the packet from a first destination address (unique to the service instance) to a second destination address (the shared address between the services). Once transitioned the service may use data structure 400 to determine whether a connection has been established with the source asset, and process the packet based on whether a connection has been established.

For example, if a communication is received with source IP address 422, a destination address 425 (corresponding to the translated shared network address), source port 432, destination port 437, and protocol 442, then the communication may be identified as an established connection, and processed according to a service executing on the service instance. In contrast, it the communication is received that does not match an entry within data structure 400, then the communication may be blocked prior to being processed.

In generating data structure 400, the primary service may negotiate communication parameters with the computing asset within the organization network, and store the connection information for the connection within the data structure. Once stored, the information may be provided to the failover service instance, such that the failover service instance may implement the functionality of the primary service during a failover event.

Figure 5:
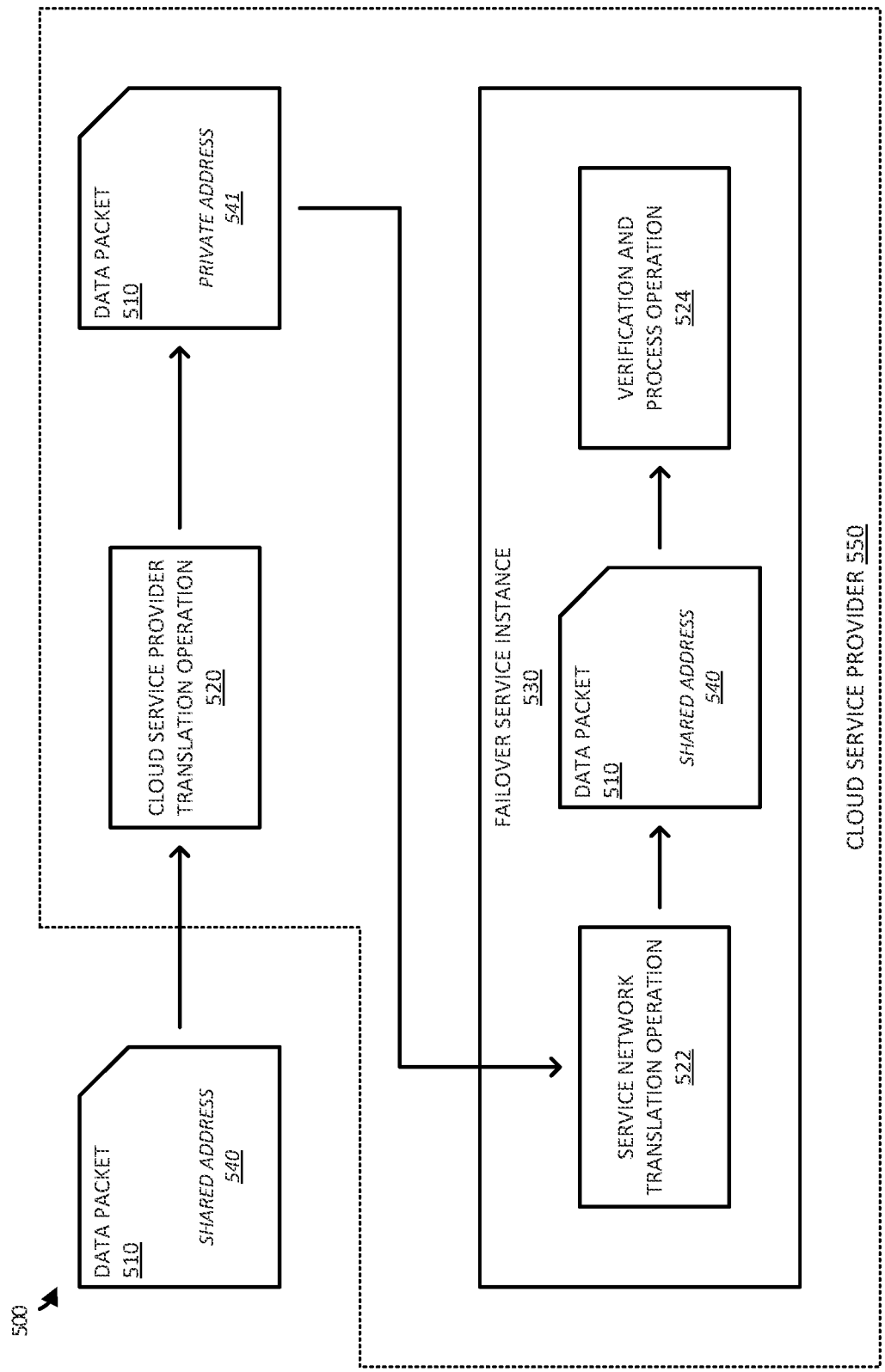
FIG. 5 illustrates an overview of a packet flow to a failover service instance according to an implementation.

FIG. 5 illustrates an overview 500 of a packet flow to a failover service instance according to an implementation. Overview 500 includes data packet 510, cloud service provider translation operation 520, service network translation operation 522 and verification and process operation 524. Cloud service provider translation operation 520 executes in the software defined networking processes of cloud service provider 550, while service network translation operation 522 and verification and process operation 524 execute within failover service instance 530. Although demonstrated in the example of FIG. 5 as using the failover service, it should be understood that similar operations may be provided by the primary service in translating addressing of communications.

In operation, when computing assets initiate a communication session with a primary service instance, the primary service instance will cache connection information for the communication. In caching the connection information, the primary service instance will receive a packet using a first destination IP address that is unique to the primary instance. Once received at the primary instance, the primary instance will replace the destination IP address with a shared destination IP address that is shared with a backup instance for the service. The shared IP address may then be stored in at least one data structure with other information about the connection including the source IP address, source and destination ports, protocols, or some other similar connection information. After being stored at the primary instance, the connection information may be communicated to the backup instance in preparation for a failover event, e.g. such as a failure of the host at the first instance.

Once a failover event occurs, the software defined networking processes of cloud service provider 550 will forward communications to the backup or failover instance instead of the primary instance. Specifically, when a data packet is identified by cloud service provider 550 with the shared IP address, the cloud service provider will forward the packet to the active backup service instance by translating the shared IP address to the unique IP address associated with failover service instance 530. Referring to the example in overview 500, data packet 510 is received by cloud service provider 550, wherein the packet is processed using cloud service provider translation operation 520. In processing the packet, cloud service provider translation operation 520 will identify shared address 540 in the packet and translate the packet to the active instance associated with the shared address. In the present implementation, because failover service instance 530 is active for the service, shared address 540 is translated to private address 541 associated with service instance 530 and forwarded to the virtual network interface of the service instance. Once the packet is received at a virtual network interface of service instance 530, service instance 530 will perform service network translation operation 522 to determine whether a connection has been previously established with the source computing asset.

In some implementations, when the packet is forwarded to service instance 530, the packet is received using the unique address for the service instance. Once received and translated to shared IP address 540, service instance 530 performs verification and process operation 524. Verification and process operation 524 determines whether a connection has been established with the source asset, and if a connection has been established processes the packet in accordance with a service executing on service instance 530. However, if a connection is not established, then verification and process operation 524 may block the communication and prevent the communication from being processed by the service.

Figure 6:
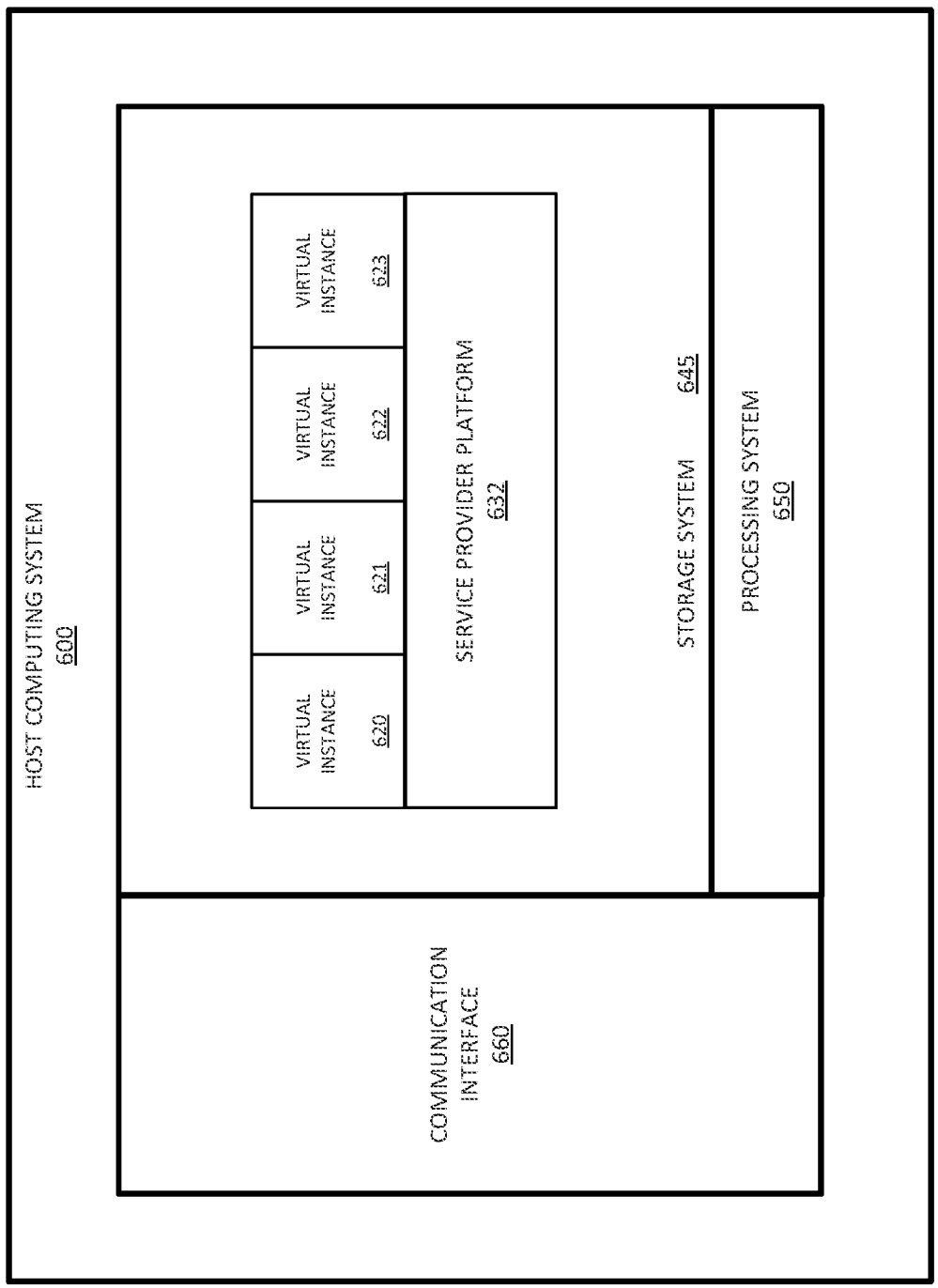
FIG. 6 illustrates a host computing system of a cloud service provider according to an implementation.

FIG. 6 illustrates a host computing system 600 according to an implementation. Host computing system 600 is representative of any computing system or systems with which the various operational architectures, processes, scenarios, and sequences disclosed herein for a host can be implemented. Host computing system 600 is an example host for cloud service provider 110 of FIG. 1, although other examples may exist. Host computing system 600 includes storage system 645, processing system 650, and communication interface 660. Processing system 650 is operatively linked to communication interface 660 and storage system 645. Communication interface 660 may be communicatively linked to storage system 645 in some implementations. Host computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. In some implementations, communication interface 660 may be configured to communicate with other host computing systems and elements the provide the cloud service. Additionally, communication interface 660 may be configured to communicate with computing assets of one or more organization computing networks, wherein the assets may communicate with host computing system 600 to communicate with a service executing on the host.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device, but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises virtual instances 620-623, and service provider platform 632. The operating software on storage system 645 may further include an operating system, utilities, drivers, network interfaces, applications, or some other type of software. When read and executed by processing system 650 the operating software on storage system 645 directs host computing system 600 to operate as described herein.

In one implementation, virtual instances 620-623 execute on host computing system 600 to provide various services for one or more organizations. In at least one implementation, a virtual instance of virtual instances 620-623 may provide backup service to computing assets for a particular organization. In providing the backup service, the virtual instance may communicate with a primary instance that provides the service to the computing assets, wherein the communications may provide information about the currently established connections on the primary asset. This connection information may include source and destination addressing information, protocol information, or some other similar information about connections established with the primary instance.

Once a failover event occurs at the primary instance, the operations of the primary instance may failover to the backup instance in virtual instances 620-623. In providing the high-availability failover operations, service provider platform 632 may permit the organization to associate a shared address to multiple service instances. This ensure that when a first instance fails or requires an update, the same address may be used by assets to address a second instance that provides the same or similar functionality. When the communications are received by the cloud service provider platform, the cloud service provider will identify the currently active instance, and forward the communication to the appropriate instance. In the present implementation, when the communication is forwarded to the destination virtual instance, the destination virtual instance receives the communication at a unique IP address associated with the instance. Thus, while the computing asset in the organization's network may use the shared IP address to ensure high-availability of a particular service, service provider platform 632 may be used to replace the IP addressing as required for the currently active instance.

As an example, if virtual instance 622 represented a backup service, then a communication may be received by virtual instance 622 that includes a first destination network address, wherein the first destination network address corresponds to a unique IP address for virtual instance 622. To provide the failover functionality and determine whether a connection was established with a primary instance, virtual instance 622 may replace the unique destination address corresponding to virtual instance 622 to the shared address that is shared between backup virtual instance 622 and the primary virtual instance. In some implementations, the primary and backup virtual instances may execute on separate hosts or in separate data centers. These separate hosts or data centers may ensure high availability for the service even as a result of hardware failure for the host or data center. In some implementations, the primary and backup instance may each operate in separate IP subnets. As a result, it may be difficult to move the IP address (or network configuration) from the first service instance to the second service instance. Here, instead Once the IP address is modified for the virtual instance, the virtual instance may determine whether a connection has been established with the source of the communication based at least in part on the shared IP address and connection information that was obtained from the primary instance. In particular, traits of the packet including addressing and protocol traits may be used to determine whether the communication has been established. If a communication has been established, then the communication may be processed in accordance with the service on the virtual instance, however, if a communication has not been established then the packet may be blocked from further processing by the service.

Returning to the elements of FIG. 1, cloud service provider 110 may comprise a plurality of physical computing systems, wherein each of the physical computing systems may include communication interfaces, network interfaces, processing systems, microprocessors, storage systems, storage media, or some other processing devices or software systems. Examples of the physical computing systems can include software such as an operating system, logs, databases, utilities, drivers, networking software, and other software stored on a computer-readable medium. The physical computing systems may comprise serving computing systems, routing and switching computing systems, desktop computing systems, or some other similar computing system, including combinations thereof, capable of providing a platform for the execution of service instances.

Computing assets 150 and other computing systems 160 may each include communication interfaces, network interfaces, processing systems, microprocessors, storage systems, storage media, or some other processing devices or software systems. Examples of computing assets 150 and other network computing systems 160 can include software such as an operating system, logs, databases, utilities, drivers, networking software, and other software stored on a computer-readable medium. Computing assets 150 and other network computing systems 160 may comprise physical or virtual computing elements, such as desktop computing systems, serving computing systems, mobile computing systems, virtual machines, containers, or other similar computing elements, including combinations thereof.

Communication between cloud service provider 110, organization network 140, and other computing system 160 may use metal, glass, optical, air, space, or some other material as the transport media. Communication between cloud service provider 110, organization network 140, and other computing system 160 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between cloud service provider 110, organization network 140, and other computing system 160 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   maintaining session information for one or more sessions established with a primary service instance, wherein the maintained session information indicates a first network address that is shared between the primary service instance and a backup service instance as a destination address for the one or more sessions;
   periodically providing the maintained session information to the backup service instance;
   identifying a failover condition for the primary service instance; and transitioning the one or more sessions from the primary service instance to the backup service instance.

2. The method of claim 1, wherein transitioning the one or more sessions comprises, based on receiving a first packet from a source computing asset, determining if the first packet corresponds to any of the one or more sessions based on the maintained session information.

3. The method of claim 2 further comprising translating a destination address of the first packet to the first network address shared between the primary and backup service instances.

4. The method of claim 3, wherein determining if the first packet corresponds to any of the one or more sessions comprises determining if traits associated with the first packet match traits of any of the one or more sessions based on translating the destination address of the first packet to the first network address.

5. The method of claim 2 further comprising, based on determining that the first packet does not correspond to any of the one or more sessions, preventing the backup service instance from processing the first packet.

6. The method of claim 1 further comprising:
based on receiving a second packet that indicates the first network address as a destination address, determining which of the primary and backup service instances is active based on translating the first network address to a private network address associated with an active service instance; and
translating the private network address back to the first network address based on determining the active service instance.

7. The method of claim 6, wherein maintaining the session information comprises maintaining information about a session associated with the second packet based on translating the private network address back to the first network address, wherein the information about the session that is maintained comprises the first network address as a destination address for the session.

8. The method of claim 1, wherein the primary service instance and the backup service instance correspond to different subnets, and wherein the first network address is a network address that does not belong to either of the different subnets.

9. The method of claim 1, wherein the primary service instance and the backup service instance execute on different hosts or in different data centers.

10. One or more non-transitory computer-readable media having program code stored thereon, the program code comprising instructions to:
maintain session information for one or more sessions established with a primary service instance, wherein the maintained session information indicates a first network address that is shared between the primary service instance and a backup service instance as a destination address for the one or more sessions;
periodically provide the maintained session information to the backup service instance;
identify a failover condition for the primary service instance; and
transition the one or more sessions from the primary service instance to the backup service instance.

11. The non-transitory computer-readable media of claim 10, wherein the instructions to transition the one or more sessions comprise instructions to, based on receipt of a packet from a source computing asset, determine whether the packet corresponds to any of the one or more sessions based on the maintained session information.

12. The non-transitory computer-readable media of claim 11, wherein the program code further comprises instructions to translate a destination address of the packet to the first network address shared between the primary and backup service instances.

13. The non-transitory computer-readable media of claim 12, wherein the instructions to determine whether the packet corresponds to any of the one or more sessions comprise instructions to determine whether traits associated with the packet match traits of any of the one or more sessions based on the translation of the destination address of the packet to the first network address.

14. The non-transitory computer-readable media of claim 11, wherein the program code further comprises instructions to, based on a determination that the packet does not correspond to any of the one or more sessions, prevent the backup service instance from processing the packet.

15. An apparatus comprising:
a processor; and
a computer-readable medium having instructions stored thereon that are executable by the processor to cause the apparatus to,
maintain session information for one or more sessions established with a primary service instance, wherein the maintained session information indicates a first network address that is shared between the primary service instance and a backup service instance as a destination address for the one or more sessions;
periodically provide the maintained session information to the backup service instance;
identify a failover condition for the primary service instance; and
transition the one or more sessions from the primary service instance to the backup service instance.

16. The apparatus of claim 15, wherein the instructions executable by the processor to cause the apparatus to transition the one or more sessions comprise instructions executable by the processor to cause the apparatus to, based on receipt of a first packet from a source computing asset, determine if the first packet corresponds to any of the one or more sessions based on the maintained session information.

17. The apparatus of claim 16 further comprising instructions executable by the processor to cause the apparatus to translate a destination address of the first packet to the first network address shared between the primary and backup service instances.

18. The apparatus of claim 17, wherein the instructions executable by the processor to cause the apparatus to determine if the first packet corresponds to any of the one or more sessions comprise instructions executable by the processor to cause the apparatus to determine if traits associated with the first packet match traits of any of the one or more sessions based on the translation of the destination address of the first packet to the first network address.

19. The apparatus of claim 15 further comprising instructions executable by the processor to cause the apparatus to
based on receipt of a second packet that indicates the first network address as a destination address, determine which of the primary and backup service instances is active based on translation of the first network address to a private network address associated with an active service instance; and
translate the private network address back to the first network address based on determination of the active service instance.

20. The apparatus of claim 19, wherein the instructions executable by the processor to cause the apparatus to maintain the session information comprise instructions executable by the processor to cause the apparatus to maintain information about a session associated with the second packet based on translation of the private network address back to the first network address, wherein the information about the session that is maintained comprises the first network address as a destination address for the session.

* * * * *